US008372900B2

(12) United States Patent
Shooshtari et al.

(10) Patent No.: US 8,372,900 B2
(45) Date of Patent: Feb. 12, 2013

(54) CELLULOSIC COMPOSITE WITH BINDER COMPRISING SALT OF INORGANIC ACID

(75) Inventors: Kiarash Alavi Shooshtari, Littleton, CO (US); Philip Francis Miele, Highlands Ranch, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 255 days.

(21) Appl. No.: 12/543,625

(22) Filed: Aug. 19, 2009

(65) Prior Publication Data

US 2011/0046271 A1 Feb. 24, 2011

(51) Int. Cl.
*C08K 11/00* (2006.01)
*C08L 89/00* (2006.01)
*C08L 97/02* (2006.01)
*C08G 12/00* (2006.01)
*C08G 79/02* (2006.01)
*C08G 12/04* (2006.01)

(52) U.S. Cl. .............. 524/9; 524/14; 528/244; 528/229; 528/266

(58) Field of Classification Search ................ 524/9, 14; 528/244, 229, 399
See application file for complete search history.

(56) References Cited

U.S. PATENT DOCUMENTS

| | | | | |
|---|---|---|---|---|
| 3,438,931 A | * | 4/1969 | Mitchell et al. | 524/509 |
| 3,872,051 A | * | 3/1975 | Tiedeman et al. | 524/441 |
| 3,920,613 A | * | 11/1975 | Freeman et al. | 525/503 |
| 4,183,997 A | | 1/1980 | Stofko | |
| 4,524,164 A | * | 6/1985 | Viswanathan et al. | 524/14 |
| 4,692,478 A | | 9/1987 | Viswanathan et al. | |
| 5,243,015 A | * | 9/1993 | Hutchings et al. | 528/129 |
| 6,194,477 B1 | * | 2/2001 | Cawse et al. | 521/76 |
| 7,655,711 B2 | | 2/2010 | Swift et al. | |
| 7,709,557 B2 | * | 5/2010 | Medoff et al. | 523/129 |
| 7,772,347 B2 | * | 8/2010 | Swift et al. | 527/312 |
| 2003/0079833 A1 | * | 5/2003 | Pirhonen et al. | 156/335 |
| 2005/0191924 A1 | * | 9/2005 | Taylor et al. | 442/331 |
| 2007/0027283 A1 | | 2/2007 | Swift et al. | |
| 2007/0043173 A1 | * | 2/2007 | Pirhonen et al. | 525/480 |
| 2007/0123679 A1 | | 5/2007 | Swift et al. | |
| 2007/0123680 A1 | | 5/2007 | Swift et al. | |
| 2008/0145637 A1 | * | 6/2008 | Frank | 428/292.4 |
| 2009/0011214 A1 | * | 1/2009 | Wang | 428/305.5 |
| 2009/0104458 A1 | * | 4/2009 | Ryu | 428/446 |
| 2009/0317626 A1 | * | 12/2009 | Tiarks et al. | 428/331 |
| 2010/0301256 A1 | * | 12/2010 | Hampson et al. | 252/62 |
| 2011/0009530 A1 | * | 1/2011 | Kasmayr et al. | 524/13 |

FOREIGN PATENT DOCUMENTS

| | | |
|---|---|---|
| DE | 19 05 054 A1 | 8/1969 |
| EP | 2 223 941 A1 | 9/2010 |
| GB | 2 451 719 A | 2/2009 |
| WO | 2008/089847 A1 | 7/2008 |

* cited by examiner

*Primary Examiner* — Liam Heincer
(74) *Attorney, Agent, or Firm* — Robert D. Touslee

(57) ABSTRACT

Provided is a cellulosic composite comprised of cellulosic material and a binder. The binder comprises an aldehyde or ketone and amine salt of an inorganic acid. The composition when mixed with cellulosic material and cured forms a cellulosic composite.

15 Claims, No Drawings

CELLULOSIC COMPOSITE WITH BINDER COMPRISING SALT OF INORGANIC ACID

BACKGROUND

The subject invention pertains to a cellulosic composite which uses an improved binding composition. More specifically, the invention pertains to a cellulosic composite which employs as a binder an improved curable composition comprising a mixture of an aldehyde or ketone with an amine salt of an inorganic acid. Upon curing, a water insoluble polymer composition is formed.

Composite wood products prepared from various lignocellulosic materials (e.g., wood) have been known for centuries, although industrial production began only about a century ago. Among other things, these products offer a relatively low cost and a reasonably high strength to weight ratio. Consequently, they are used in a number of capacities including interior and exterior construction, furniture and even marine applications. Several distinct composite wood products exist including plywood, oriented strand board, particleboard and medium density fiberboard (MDF).

One type of molded composite article is a cellulosic (or woody) composite which includes man-made boards of bonded wood sheets and/or lignocellulosic materials, commonly referred to in the art by the following exemplary terms: fiberboards such as hardboard, medium density fiberboard, and softboard; particleboards such as chipboard, flakeboard, particleboard, strandboard, and waferboard. Wood composites also include man-made boards comprising combinations of these materials. These wood composites can be used as columns, floors, ceilings, walls, doors, siding and stairs in the construction of homes, offices, and other types of buildings, as well as furniture components, such as chairs, tables, countertops, cabinets, and cabinet doors, for example.

Many different methods of manufacturing wood composites are known in the art such as, for example, those described in U.S. Pat. No. 6,841,231. The principal processes for the manufacture of fiberboard include: (a) wet felted/wet pressed or "wet" processes; (b) dry felted/dry pressed or "dry" processes; and, (c) wet felted/dry pressed or "wet-dry" processes. Synthetic binder resins, such as amino resins, urea-formaldehyde resins, phenol-formaldehyde resins, or modified phenol-formaldehyde resins, are often used as binders in these processes. Other binders include, but are not limited to, starches, asphalt, and gums.

Products such as particleboard and MDF are typically prepared from an adhesive resin composition and comminuted lignocellulosic materials such as wood flakes or wood fibers. The manufacture of particleboard and MDF begins with the reduction of the wood particles to a particulate size or a fiber, which will occasionally be referred to herein as a furnish. This furnish is then blended with an adhesive resin and transported to a forming device, which shapes the mixture into a mat. The mat is then loaded into a heated press that shapes and pressurizes the mat to a desired thickness. The pressure and heat together act to cure the resin, which bonds the mixture into a panel or board. Bonding performance is affected by, among other factors, the amount and type of resin, the curing time and the curing pressure.

In U.S. Pat. No. 7,217,458, OSB boards are discussed. Oriented strand board ("OSB") is commercially available. OSB material generally is formed of multiple layers of wood "flakes" or "strands" bonded together by a resin binder under heat and compression to provide a unitary board structure. The flakes are made by cutting logs into thin slices with a knife edge oriented parallel to the length of a debarked log. The cut flakes are broken into narrow strands generally having lengths oriented parallel to the wood grain that are larger than the strand widths.

In one common fabrication of oriented strand board, the flakes generally are first dried to remove water, and are then coated in a blender with a thin layer of binder and sizing agent. The coated flakes are then spread on a conveyor belt to provide a surface ply or layer having flakes oriented generally in line with the conveyor belt, then one or more plies that will form an interior ply or plies of the finished board is (are) deposited on the surface ply such that the one or more plies is (are) oriented generally perpendicular to the conveyor belt. Then, another surface ply having flakes oriented generally in line with the conveyor belt is deposited over the intervening one or more plies having flakes oriented generally perpendicular to the conveyor belt. The resulting structure includes plies having flakes oriented generally perpendicular to a neighboring ply insofar, such as for each surface ply and the adjoining interior ply. The layers of oriented "strands" or "flakes" are finally exposed to heat and pressure to bond the strands and binder together to form a consolidated board structure. Other variations on this basic manufacturing scheme also are known. The resulting product is then cut to size and shipped. Typically, the resin and sizing agent comprise less than 10% by weight of the oriented strand board.

The predominant resin systems in the composite wood industry are urea-formaldehyde (UF) and phenol-formaldehyde (PF) resins. Although these formaldehyde-based resins perform consistently, the physical properties of composite wood products prepared with formaldehyde-based resins are often unsatisfactory. For example, the internal bond strength of composite wood products frequently renders them unfit for certain demanding applications. In addition, such products are commonly susceptible to significant swelling upon exposure to moisture. As a consequence of these and other factors, composite wood products prepared with UF and PF resins are often less robust than desired.

Currently, alternatives to formaldehyde-based resins are being investigated. See, for example U.S. Pat. No. 6,822,042. The potentially attractive alternatives include resin systems that employ isocyanates. Such resin systems have been shown to impart markedly improved physical properties to composite wood products. For example, concentrated isocyanate-based resins increase bonding strength, and therefore offer a more robust and durable composite wood product. Unfortunately, isocyanate-based resins also have several known drawbacks that have limited their commercial utility. First, isocyanates are relatively expensive as compared to other resin materials. Consequently, concentrated isocyanate-based resins are uneconomical as compared with traditional formaldehyde-based resins. Second, unlike UF and PF resins, isocyanates are highly reactive with water. Consequently, isocyanates react quickly with any water present in either the wood furnish or the resin itself. This limits both the shelf-life of the resin and the lignocellulosic materials with which it can be used. Third, isocyanates are toxic and their use creates environmental, health and industrial hygiene concerns. Thus, process safety considerations influence against the use of concentrated isocyanate-based resins.

Accordingly, in one aspect the present invention provides a novel cellulosic composite comprised of a unique formaldehyde free binder.

Another aspect of the invention provides a novel cellulosic composite with a binder which provides the possibility of lower binder usage, the possibility of overall lower energy consumption, increased sustainability of the raw materials utilized in the formation of the binder, considerable reduction in the use of petroleum based ingredients and improved overall economics.

Still another aspect of the present invention is to provide a cellulosic composite which employs a unique binder having improved economics, improved health, safety and environment factors by eliminating formaldehyde and isocyanate while also enjoying improved physical properties.

These and other aspects of the present invention will become apparent to the skilled artisan upon a review of the following description and the claims appended hereto.

SUMMARY OF THE INVENTION

Provided is a cellulosic composite comprised of cellulosic material and a binder. The binder is a curable composition comprising a mixture of an aldehyde or ketone and an amine salt of an inorganic acid. The preferred acid is phosphoric acid. This composition upon curing is capable of forming a water-insoluble binder.

A process for preparing the cellulosic composite is also provided comprising mixing in with the cellulosic material a composition comprising an aldehyde or ketone and an amine salt of an inorganic acid. Thereafter the composition is cured while present in mixture with the cellulosic material to form a water-insoluble binder.

DETAILED DESCRIPTION OF PREFERRED EMBODIMENTS

The cellulosic composite is comprised of cellulosic material and a binder. The cellulosic material can be derived from any cellulosic source synthetic or natural such as wood or plants. It is preferred that a wood cellulosic material is used to prepare a particle board or an oriented strand board.

Cellulosic fibers such as, for example, wood fibers are prepared by the fiberization of woody chip material in a pressurized refiner, an atmospheric refiner, a mechanical refiner, and/or a thermochemical refiner. Generally, in a wet process, the cellulosic fibers are blended in a vessel with large amounts of water to form a slurry. The slurry preferably has sufficient water content to suspend a majority of the wood fibers and preferably has a water content of at least 95 percent by weight (wt. %). The water is used to distribute the synthetic resin binder over the wood fibers. This mixture is deposited onto a water-pervious support member, such as a fine screen or a Fourdrinier wire, and pre-compressed, whereby much of the water is removed to leave a wet mat of cellulosic material having, for example, a moisture content of at least about 50 wt. % based on the weight of dry cellulosic material. The wet mat is transferred to a press and consolidated under heat and pressure to form the molded wood composite.

A wet-dry forming process can also be used to produce wood composites. Preferably, a wet-dry process begins by blending cellulosic material (e.g., wood fibers) in a vessel with a large amount of water. This slurry is then blended with a resin binder. The blend is then deposited onto a water-pervious support member, where a large percentage (e.g., 50 wt. % or more) of the water is removed, thereby leaving a wet mat of cellulosic material having a water content of about 40 wt. % to about 60 wt. %, for example. This wet mat is then transferred to a zone where much of the remaining water is removed by evaporation by heat to form a dried mat. The dried mat preferably has a moisture content of about 10 wt. % or less. The dried mat can be finished at this point or transferred to a press and consolidated under heat and pressure to form a higher density wood composite which may be a flat board or a molded product, for example. The product can be molded into various shapes or geometries depending on the intended use.

In a dry forming process, cellulosic fibers are generally conveyed in a gaseous stream or by mechanical means. For example, the fibers supplied from a fiberizing apparatus (e.g., a pressurized refiner) may be coated with the binder composition in a blowline blending procedure, wherein the resin is blended with the fiber with the aid of air turbulence. Thereafter, the resin-coated fibers from the blowline can be randomly formed into a mat by air blowing the fibers onto a support member. Optionally, the fibers, either before or after formation of the mat, can be subjected to pre-press drying, for example in a tube-like dryer. The formed mat, typically having a moisture content of less than about 10 wt. %, and preferably about 5 wt. % to about 10 wt. %, then is pressed under heat and pressure to cure the thermosetting resin and to compress the mat into an integral consolidated structure.

As an alternative to conventional pressing, steam injection pressing is a consolidation step that can be used, for example, under certain circumstances in the dry and wet-dry process production of consolidated cellulosic composites. In steam injection pressing, steam is injected through perforated heating press platens, into, through, and then out of a mat that includes the synthetic resin and the filler material. The steam condenses on surfaces of the filler and heats the mat. The heat transferred by the steam to the mat as well as the heat transferred from the press platens to the mat cause the resin to cure.

The binder of the present invention, which is employed in making the cellulosic composite comprises a curable composition containing an aldehyde or ketone and an amine salt of an inorganic acid.

The salt can be any amine salt of an inorganic acid. This includes ammonium salts and amine-acid salts, which are considered amine salts. Any suitable inorganic acid can be used. The acids can be oxygenated acids or non-oxygenated acids. Examples of suitable oxygenated acids include, but are not limited to, phosphoric acid, pyrophosphoric acid, phosphorus acid, nitric acid, sulfuric acid, sulfurous acid, boric acid, hypochloric acid and chlorate acid. Examples of non-oxygenated acids include, but are not limited to, hydrochloric acid, hydrogen sulfide and phosphine. Phosphoric acid is most preferred.

The salt can be prepared using any conventional technique to create salts of inorganic acids. Ammonium salts of an inorganic acid, e.g., phosphoric acid, is one of the preferred salts. Reacting ammonia with the acid will yield the salt. Amine-acid salts are also preferred, with such salts obtained by reacting the selected amine with the acid in water. This is a very simple and straightforward reaction. The molar ratio of acid functionality to amine functionality can vary, and is generally from 1:25 to 25:1. More preferred is a ratio of from 1:5 to 5:1, with a ratio of about 1:2 to 2:1 being most preferred.

Example of amines include, but are not limited to, aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, ethers and others. Representative amines that are suitable for use in such an embodiment include 1,2-diethylamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, and mixtures of these. A preferred diamines for use in this embodiment of the invention are 1,4-butanediamine and 1,6-hexanediamine. Natural and synthetic amino acids such as lysine, arginine, histidine, etc can also be used.

To the solution of the amine salt of inorganic acid, the carbonyl functional materials can be added, especially an aldehyde or ketone. Due to their higher reactivity, aldehydes are preferred to ketones. The composition comprises the amine salt of an inorganic acid and the aldehyde and/or ketone. Some small amount of reaction does take place within the composition between the components. However, the reaction is completed during the curing step, followed by the cross-linking reaction of curing.

Examples of suitable aldehydes include, but are not limited to, mono- and multifunctional aldehydes including acetaldehyde, hydroxy acetaldehyde, butyraldehyde, acrolein, furfural, glyoxal, glyceraldehyde, glutaraldehyde, polyfurfural, poly acrolein, copolymers of acrolein and others. Reducing mono di- and polysaccharides such as glucose, maltose, celobiose etc. can be used, with reducing monosaccharides such as glucose being preferred.

Examples of ketones include, but are not limited to, acetone, acetyl acetone, 1,3dihydroxy acetone, benzil, bonzoin, fructose, etc.

The carbonyl compound i.e., the aldehyde and/or ketone, reacts with the amine salt of the inorganic acid. The amount of aldehyde and/or ketone added is generally such that the molar ratio of acid in the amino-amide or ammonium salt intermediate to carbonyl or ketone is from 1:50 to 50:1. A ratio of 1:20 to 20:1 is more preferred, with a ratio of 1:10 to 10:1 being most preferred.

The composition when mixed in with the cellulosic material can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

Thereafter the composition undergoes curing wherein a strong binder is formed. Such curing can be conducted by heating. Elevated curing temperatures on the order of 100 to 300° C. generally are acceptable. Satisfactory curing results are achieved by heating in an air oven at 200° C. for approximately 20 minutes. The curing can occur during the formation of the composite, for example, when the water is being removed from the composite.

The present invention provides a formaldehyde-free route to form a securely bound formaldehyde-free composite product. The binder composition of the present invention also provides improved overall economics. The binder has the advantages of being stronger and offering lower amounts of relative organic content during curing, which ensures a safer work place and environment. The cure time of the binder is also seen to be much faster and therefore does favor the economics and lowers the carbon footprint. The binder also contains high level of sustainable raw materials further reducing the dependency to fossil based sources for the resin.

The following examples are presented to provide specific examples of the present invention. In each instance the thin glass plate substrate that receives the coating can be replaced by a cellulosic mixture. By mixing the binder used in the examples with cellulosic material, either fibrous, wood chips or a combination, an improved cellulosic composite can be obtained. It should be understood, however, that the invention is not limited to the specific details set forth in the Examples. Formation of Amine Salt of Inorganic Acid Intermediates:

To 1160 g of 1,6hexanediamine (HMDA) dissolved in 2140 g water, 980 g phosphoric acid was added slowly and the solution was stirred for 10 min. The intermediate was labeled HP1/1.

Another intermediate was formed by dissolving 1160 g of HMDA in 3120 g water. Next, 1960 g phosphoric acid was added slowly and the solution was stirred for 10 min. This intermediate solution was labeled HP1/2.

These intermediates were utilized to make the following resins with glucose.

EXAMPLE 1

To 42.8 g of solution of HP1/1 intermediate anhydrous dextrose and water was added. The mass of added water was chosen to be equal to that of the corresponding dextrose. The mass of dextrose (and corresponding water) used was 72 g, 108 g, 144 g. 180 g, 216 g, 252 g, 288, 324, 360 g and 396 g. The various solutions were stirred at ambient temperature for 10 min. The solutions were applied as a thin film on a glass and A1 panel, dried in an oven at 100° C. for 5 min and cured at 200° C. for 20 min. Each solution gave a cured brown polymer that was hard and insoluble in water and solvents.

EXAMPLE 2

To 62.4 g of solution of HP1/2 intermediate, anhydrous dextrose and water was added. The mass of added water was chosen to be equal to that of the corresponding dextrose. The mass of dextrose (and corresponding water) used was 72 g, 108 g, 144 g. 180 g, 216 g, 252 g, 288, 324, 360 g and 396 g. The various solutions were stirred at ambient temperature for 10 min. The solutions were applied as a thin film on a glass and A1 panel, dried in an oven at 100° C. for 5 min and cured at 200° C. for 20 min. Each solution gave a cured brown polymer that was hard and insoluble in water and solvents.

EXAMPLE 3

Examples 1-2 were repeated in the presence of 5% by weight ammonium sulfate. The polymers became insoluble in water in less than 10 min.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

That which is claimed is:

1. A cellulosic composite comprising cellulosic material and a formaldehyde-free binder comprised of a reducing sugar and an amine salt of phosphoric acid, wherein the amine salt of phosphoric acid is reacted with the reducing sugar, and wherein the amine salt of phosphoric acid comprises at least one N—C bond.

2. The composite of claim 1, wherein the salt is an amine-acid salt.

3. The composite of claim 2, wherein the amine is a diamine having at least one primary amine group.

4. The composite of claim 2, wherein said amine is selected from the group consisting of ethylene diamine, 1,3-propanediamine, 1,4-butanediamine, 1,5-pentanediamine, 1,6-hexanediamine, α, α'-diaminoxylene, diethylenetriamine, triethylenetetramine, tetraethylenepentamine, and mixtures thereof.

5. The composite of claim 4 wherein the amine is 1,6-hexanediamine.

6. The composite of claim 1, wherein the reducing sugar is a reducing monosaccharide, disaccharide or polysaccharide.

7. The composite of claim 6, wherein the reducing sugar is glucose.

8. The composite of claim 1, wherein the composite is an OSB product.

9. The composite of claim 1, wherein the composite is a particle board.

10. A process for preparing a cellulosic composite comprising mixing the binder of claim 1 with cellulosic material and thereafter curing said binder while present in mixture with the cellulosic material.

11. The process of claim 10, wherein the salt is an amine-phosphoric acid salt.

12. The process of claim 11, wherein the amine is a diamine having at least one primary amine group.

13. The process of claim 11, wherein said amine is selected from the group consisting of 1,2-diethylamine, 1,3-propanediamine, 1,4-butanediamine, 1,5-pentanediamine, 1,6-hexanediamine, α, α'-diaminoxylene, diethylenetriamine, triethylenetetramine, tetraethylenepentamine, and mixtures thereof.

14. The process of claim 10, wherein mixing the binder and cellulosic material is performed at a first temperature, and the curing further comprises:
drying the composite at a second temperature greater than the first temperature for a first period of time; and
curing the composite at a third temperature greater than the second temperature for a second period of time.

15. The process of claim 14, wherein the second temperature is about 100° C., and the first period of time is about 5 minutes.

* * * * *